June 30, 1959   W. C. BUTTERFIELD ET AL   2,892,925
WELDING APPARATUS
Filed Jan. 7, 1958

INVENTORS.
WILLIAM C. BUTTERFIELD
JOHN D. MADDEN
BY
ATTORNEY

United States Patent Office 2,892,925
Patented June 30, 1959

2,892,925

WELDING APPARATUS

William C. Butterfield and John D. Madden, Seattle, Wash., assignors to Boeing Airplane Company, Seattle, Wash., a corporation of Delaware Application January 7, 1958, Serial No. 707,554

4 Claims. (Cl. 219—127)

This invention relates to welding apparatus, and more particularly to tungsten arc spot welding apparatus in which a filler wire or rod is fed into the fusion zone.

In many applications such as in the aircraft industry the area in which a spot weld is to be made is quite restricted. Therefore, the diameter of the weld face must be held to a minimum and yet the weld must have adequate tensile shear strength. This means that the diameter of the faying surface of the weld should approach as closely as possible the diameter of the weld face. In other words, the cone angle of the weld nugget should be relatively small.

Heretofore, in accordance with the prior art, it has been found that the provision of an inert gas in conjunction with the tungsten arc spot welding does decrease to a certain extent the cone angle of the weld nugget. However, the amount the cone angle can be decreased is limited since if decreased to a desired value a burn through of the weld occurs.

A further objectionable feature that has heretofore occurred in a tungsten arc spot weld is the formation of a dimple in the face of the weld. This action produces crater cracks in the weld face which over a period of time propagate, thus decreasing the strength of the weld. Of course, such dimpling and crater cracks detract from the appearance of the weld.

Therefore, an object of this invention is to provide a method and apparatus for minimizing the dimpling effect in tungsten arc spot welds, to thus improve both the quality and the appearance of the weld.

Another object of this invention is to provide for minimizing crater cracks in the weld face of a tungsten arc spot weld to thereby improve the quality of the weld.

A further object of this invention is to provide for increasing the tensile shear strength of a tungsten arc spot weld for a given gauge or gauges of material being welded by increasing the diameter of the faying surface of the weld without increasing the under-bead or drop-through.

A more specific object of this invention is to provide for feeding a filler wire into the fusion zone of a tungsten arc spot weld during a predetermined portion of the welding cycle, to thus decrease the cone angle of the weld and thereby increase the tensile shear strength of the weld.

Figure 1:
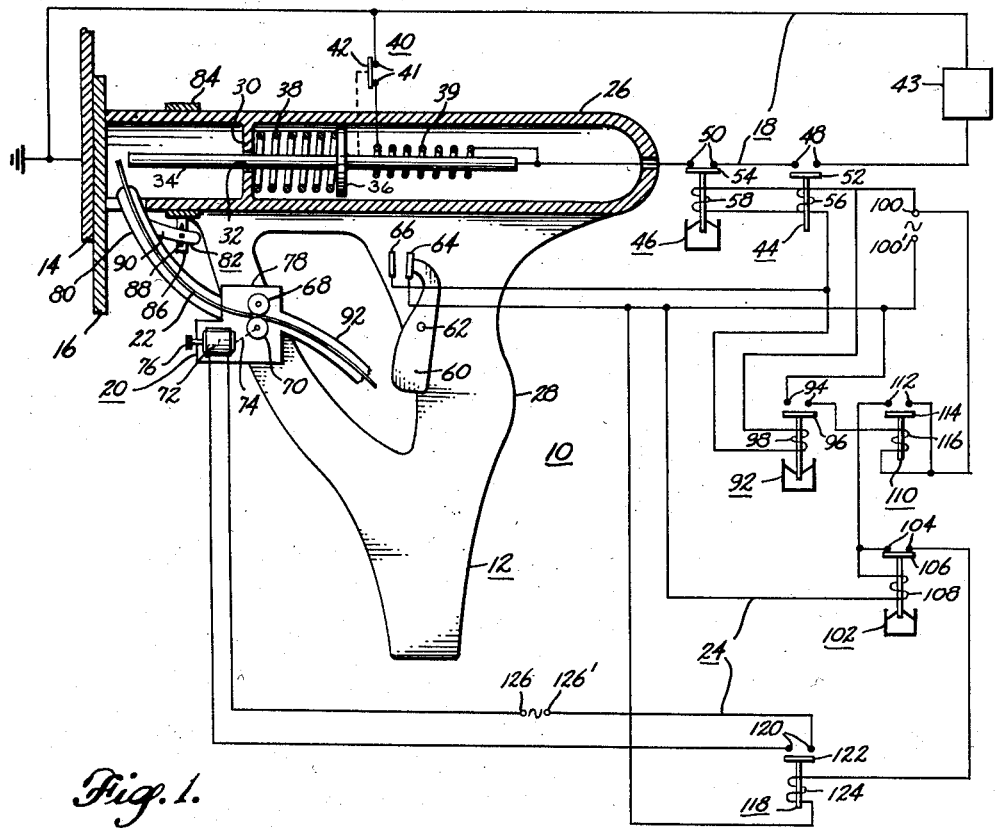
Figure 2:
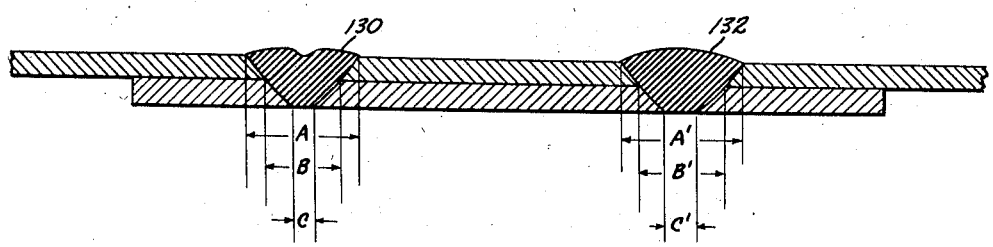

Other objects of this invention will become apparent from the following description when taken in conjunction with the accompanying drawing in which:

Fig. 1 is a schematic diagram of apparatus and circuits illustrating this invention, and Fig. 2 is an illustration of a weld produced in accordance with the teachings of this invention and a weld produced in accordance with the teachings of the prior art.

Referring to Fig. 1 there is illustrated welding apparatus 10 embodying the teachings of this invention. In general, the welding apparatus 10 comprises a welding gun or torch 12 adapted to effect a weld between two sheets of material 14 and 16; circuit means 18, responsive to the action of the welding gun 12, for effecting an electric arc which is directed at the sheets of material 14 and 16; control means 20 for feeding filler wire 22 into the fusion zone; and circuit means 24, also responsive to the action of the welding gun 12, for controlling the control means 20 to thus effect a feeding of the filler wire 22 into the fusion zone during a predetermined portion of the welding cycle.

The welding gun 12 comprises an electrode holding portion 26 and a handle portion 28. As illustrated, the electrode holding portion 26 includes as an integral part thereof a circular-shaped flange 30 having a passage-way 32 associated therewith through which a tungsten electrode 34 passes. Secured to the electrode 34 and carried thereby is a disc 36 which in conjunction with the flange 30 and a compression spring 38 functions to bias the electrode 34 to the right as shown in the drawing.

In order to effect an actuation of the electrode 34 to the left, as shown, until it engages the sheet of material 16 a solenoid 39 is disposed in inductive relationship with the electrode 34. A circuit breaker 40 including stationary contacts 41 and a movable contact 42 mechanically linked to the electrode 34 operates to open the electrical circuit to the solenoid 39 once the electrode 34 engages the material 16 thus permitting the electrode 34 to return to the position shown in the drawing under the bias of the spring 38, thereby effecting an electric arc between the electrode 34 and the material 16.

In this instance, the circuit means 18 comprises a source 43 of direct-current voltage and welding current for supplying energy to the solenoid 39 and for supplying the welding current, a relay 44 for completing the welding current circuit and for completing the energizing circuit to the solenoid 39, and an adjustable time delay relay 46 which times out after a predetermined period of time, to thus establish the time duration of the welding cycle. As illustrated, the relays 44 and 46 comprise stationary contacts 48 and 50, respectively, movable contacts 52 and 54, respectively, and operating coils 56 and 58, respectively.

As will be explained more fully hereinafter the energization of the operating coils 56 and 58 of the respective relays 44 and 46, is under the control of a trigger 60 which is pivoted about a point 62 and is so disposed as to effect an actuation of a movable contact 64 into engagement with a stationary contact 66.

The control means 20 for feeding the filler wire 22 into the fusion zone comprises feed wire rollers 68 and 70 which are suitably biased toward one another against the filler wire 22 and which are provided with serrations thereon for effectively feeding the filler wire 22. The feed wire roll 70 is mechanically connected to D.-C. motor control means 72 by means of a mechanical linkage 74. A knob 76 is provided for controlling the speed of the wire feed roll 70 and thus the speed at which the filler wire 22 is fed into the fusion zone. As illustrated, the motor control means 72 and the feed wire rolls 68 and 70 are suitably housed within an enclosure 78 which is suitably secured to the handle portion 28 of the welding gun 12.

In order to maintain a tube 80, which functions to guide the filler wire 22, in fixed relationship with respect to the electrode holder portion 26 an adjustable bracket 82 is provided. In particular, a collar 84 is disposed around and is suitably secured to the electrode holder portion 26. The collar 84 has a depending arm 86 having a slot 88 therein. Suitably secured to the tube 80 is another depending arm 90 which is so connected to the depending arm 86 that by suitable adjustment the position of the tube 80 can be changed depending upon the particular welding application. The filler wire 22 is fed to the tube 80 from the feed wire rolls 68 and 70 through an insulation-covered flexible conduit 92.

As hereinbefore mentioned, the circuit means 24 controls the control means 20, to thus effect a feeding of the filler wire 22 into the fusion zone during a predetermined portion of the welding cycle. In order to control at what time during the welding cycle the flow of filler wire 22 is initiated an adjustable time delay relay 92 is provided. The relay 92 is a timed closing relay and comprises stationary contacts 94, a movable contact 96 which is disposed to be actuated into engagement with the stationary contacts 94, and an operating coil 98. Energy for the operating coil 98 is received from terminals 100 and 100' which have connected thereto a suitable source (not shown) of alternating voltage.

An adjustable time delay relay 102 is provided for controlling the time duration that the filler wire 22 is fed into the fusion zone. The time delay relay 102 is a timed opening relay and comprises stationary contacts 104, a movable contact 106 disposed to be actuated out of engagement with the stationary contacts 104, and an operating coil 108. Thus, the time delay relays 92 and 102 cooperate to determine the length of time during which the filler wire 22 is fed into the fusion zone and the portion of the welding cycle that the filler wire is so fed into the fusion zone.

An amplifying relay 110, having stationary contacts 112, a movable contact 114 which is disposed to be actuated into engagement with the stationary contacts 112, and an operating coil 116 is interposed between the time delay relays 92 and 102. In operation, the operating coils 108 and 116 of the respective relays 102 and 110 receive their energy from the terminals 100 and 100'.

For the purpose of controlling the operation of the motor control means 72 in accordance with the operation of the time delay relays 92 and 102, a relay 118 having stationary contacts 120, a movable contact member 122 disposed to be actuated into engagement with the stationary contact members 120, and an operating coil 124, is provided. The operating coil 124 likewise receives its energy from the terminals 100 and 100'. In operation, energy for the motor control means 72 is received from terminals 126 and 126' which have connected thereto a suitable source (not shown) of alternating voltage.

Before effecting a welding operation the time delay relays 46, 92 and 102 are adjusted to determine the length of the welding cycle and to determine the length of time during which the filler wire 22 is to be fed into the fusion zone and the portion of the welding cycle that the filler 22 is to be so fed. Once the relays 46, 92 and 102 are adjusted the trigger 60 is actuated so as to effect a movement of the movable contact 64 into engagement with the stationary contact 66. The latter action completes an electrical circuit to the operating coil 56, of the relay 44, which circuit extends from the terminal 100 through the operating coil 56, the stationary contact 66, and the movable contact 64, to the terminal 100'. When an energizing circuit has been completed to the operating coil 56, of the relay 44, the relay 44 is actuated to its circuit closed position thus completing an electrical circuit to the solenoid 39, which circuit extends from the positive terminal of the source 43 through the stationary contacts 48 and the movable contact 52, of the relay 44, the stationary contacts 50 and the movable contact 54, of the time delay relay 46, the solenoid 39, and the stationary contacts 41 and the movable contact 42, of the circuit breaker 40, to the negative terminal of the source 43. On energization of the solenoid 39 the electrode 34 is actuated to the left, as shown in the drawing, until it touches the sheet of material 16 at which time the movable contact 42 disengages the stationary contacts 41, of the circuit breaker 40 to thus de-energize the solenoid 39. A de-energization of the solenoid 39 permits the electrode 34 to be actuated toward the right, as shown in the drawing, under the bias of the compression spring 38. As the electrode 34 moves away from the sheet of material 16 and electric arc is struck which continues throughout the welding cycle. As can be seen from the drawing the path for the welding current extends from the positive terminal of the battery 43 through the stationary contacts 48 and the movable contact 52, of the relay 44, the stationary contacts 50 and the movable contact 54 of the time delay relay 46, the electrode 34, and the sheets of material 16 and 14, to the negative terminal of the source 43.

When the trigger 60 is actuated so as to bring the movable contact 64 into engagement with the stationary contact 66 energizing circuits are also established to the operating coils 58 and 98 of the respective relays 46 and 92. The energizing circuit for the operating coil 58, of the time delay relay 46, extends from the terminal 100 through the operating coil 58, the stationary contact 66, and the movable contact 64, to the terminal 100'. On the other hand, the energizing circuit for the operating coil 98, of the time delay relay 92, extends from the terminal 100 through the operating coil 98, the stationary contact 66, and the movable contact 64, to the terminal 100'.

The energization of the operating coil 58, of the time delay relay 46, initiates the timing operation of the relay 46 and after a predetermined time as set by the relay 46 the welding cycle terminates. In like manner, the energization of the operating coil 98, of the time delay relay 92, initiates a timing operation and after a predetermined time as set on the relay 92 the movable contact 96 is actuated into engagement with the stationary contacts 94. When the movable contact 96 is actuated into engagement with the stationary contacts 94 and energizing circuit is completed to the operating coil 116, of the relay 110, which circuits extends from the terminal 100' through the stationary contacts 94 and the movable contact 96, of the time delay relay 92, and the operating coil 116, to the terminal 100. An energization of the operating coil 116 effects an actuation of the movable contact 114 into engagement with the stationary contacts 112 to thus effect an energizing circuit to the operating coil 124, of the relay 118. This latter energizing circuit extends from the terminal 100 through the stationary contacts 112 and the movable contact 114, of the relay 110, the stationary contacts 104 and the movable contact 106, of the time delay relay 102, and the operating coil 124, to the terminal 100'. An energization of the operating coil 124 effects an actuation of the movable contact 122 into engagement with the stationary contacts 120, of the relay 118, to thus complete an energizing circuit to the motor control means 72, which energizing circuit extends from the terminal 126' through the stationary contacts 120 and the movable contact 122, of the relay 118, and the motor control means 72, to the terminal 126. The latter action effects an actuation of the feed wire roll 70 to thus effect a feeding of the filler wire 22 into the fusion zone.

When the movable contact 114, of the relay 110, is actuated into engagement with the stationary contacts 112 an energizing circuit is also completed to the operating coil 108, of the time delay relay 102, which energizing circuit extends from the terminal 100 through the stationary contacts 112 and the movable contact 114, of the relay 110, and the operating coil 108, of the time delay relay 102, to the terminal 100'. After a predetermined time as set on the time delay relay 102 the movable contact 106, of the time delay relay 102, is actuated to the circuit open position thus de-energizing the operating coil 124, of the relay 118. On de-energization of the operating coil 124 the movable contact 122 is actuated to the position shown in the drawing thus interrupting the energizing circuit to the motor control means 72, thereby stopping the feed of filler wire 22 into the fusion zone. After a further predetermined time the time delay relay 46 times out thus interrupting the flow of welding current to the electrode 34 thereby terminating the welding cycle. The aforementioned operation is then repeated for each welding operation.

Referring to Fig. 2 there is illustrated a weld nugget 130 which is typical of that produced by prior art tungsten arc welding apparatus. On the other hand a weld nugget 132 is typical of a nugget produced in accordance with the teachings of this invention. In Fig. 2, A and A' represent the weld face diameter for the nuggets 130 and 132, respectively. The diameter of the faying surface of the nugget 130 is represented by B while the corresponding diameter for the nugget 132 is represented by B'. C designates the diameter of the under bead for the nugget 130 and C' represents the corresponding diameter for the nugget 132. As can be seen from Fig. 2, the faying surface diameter B' of the nugget 132 is larger than the faying surface diameter B of the nugget 130. The cone angle for the nugget 132 is also less than the cone angle for the nugget 130. Therefore, as will be brought out by tabulated test data the tensile shear strength for the nugget 132 is greater than it is for the nugget 130. Further, the nugget 130, as can be seen from Fig. 2, has a relatively large dimple therein.

The following tabulation of test data was taken relative to .058 gage titanium sheet and illustrates the difference in the faying surface diameter and the weld face diameter when a weld is produced in accord with the teachings of this invention, in which filler wire is fed into the weld puddle, and when a weld is produced by no addition of filler wire to the weld puddle.

| Gage | Weld time (cy.) | Amps. | Wire (amt.) | Position of wire feed time in total weld time, cy. | Weld face dia. (in.) | Faying surface dia. (in.) | Under bead dia. (in.) | Tensile shear strength (lbs./sq. in) |
|---|---|---|---|---|---|---|---|---|
| .058/.058 | 101 | 158 | None | | .393 | .163 | .073 | 1,896 |
| .058/.058 | 100 | 158 | .4" x .045" | 40-60 | .363 | .180 | .073 | 2,109 |

The following tabulation of test data was taken relative to three different gages of 6A1–4V titanium alloy and shows the various results obtained when the filler wire is fed into the weld puddle at different portions of the welding cycle. As can be seen from the tabulation the best results are obtained when the filler wire is fed into the weld puddle during the last three-fifths of the welding cycle.

| Gage | Weld time (cy.) | Amps. | Wire (amt.) | Position of wire feed time in total weld time, cy. | Weld face dia. (in.) | Faying surface dia. (in.) | Under bead dia. (in.) | Tensile shear strength (lbs./sq. in) |
|---|---|---|---|---|---|---|---|---|
| .025/.025 | 149 | 49 | .3" x .032" | 20-60 | .200 | .098 | .055 | 706 |
| .025/.025 | 149 | 49 | .3" x .032" | 70-110 | .210 | .096 | .053 | 600 |
| .025/.025 | 149 | 49 | .3" x .032" | 90-130 | .200 | .100 | .025 | 734 |
| .045/.045 | 177 | 90 | .7" x .040" | 30-90 | .308 | .152 | .104 | 1,581 |
| .045/.045 | 177 | 90 | .7" x .040" | 60-100 | .318 | .160 | .126 | 1,650 |
| .045/.045 | 177 | 90 | .7" x .040" | 100-140 | .308 | .165 | .082 | 1,753 |
| .075/.075 | 272 | 130 | .9" x .040" | 30-90 | .379 | .191 | .145 | 2,675 |
| .075/.075 | 272 | 130 | .9" x .040" | 90-150 | .382 | .195 | .156 | 2,730 |
| .075/.075 | 272 | 130 | .9" x .040" | 190-250 | .375 | .200 | .066 | 3,038 |

Further tests conducted relative to 321 stainless steel produced the following tabulated results. Here again it is to be noted that the best results were produced when the filler wire was fed into the weld puddle during the last three-fifths of the welding cycle.

| Gage | Weld time (cy.) | Amps. | Wire (amt.) | Position of wire feed time in total weld time, cy. | Weld face dia. (in.) | Faying surface dia. (in.) | Under bead dia. (in.) | Tensile shear strength (lbs./sq. in) |
|---|---|---|---|---|---|---|---|---|
| .025/.025 | 86 | 50 | .15″ x .035″ | 20-50 | .150 | .094 | .092 | 534 |
| .025/.025 | 86 | 50 | .15″ x .035″ | 30-60 | .165 | .100 | .112 | 568 |
| .025/.025 | 86 | 50 | .15″ x .035″ | 40-70 | .160 | .125 | .094 | 720 |
| .042/.042 | 154 | 70 | .3″ x .035″ | 30-60 | .157 | .142 | .129 | 1,128 |
| .042/.042 | 154 | 70 | .3″ x .035″ | 70-100 | .154 | .141 | .122 | 1,082 |
| .042/.042 | 154 | 70 | .3″ x .035″ | 110-140 | .148 | .167 | .111 | 1,184 |
| .062/.062 | 194 | 100 | .4″ x .035″ | 40-70 | .178 | .164 | .112 | 1,548 |
| .062/.062 | 194 | 100 | .4″ x .035″ | 90-120 | .185 | .162 | .118 | 1,548 |
| .062/.062 | 194 | 100 | .4″ x .035″ | 140-170 | .178 | .166 | .140 | 1,618 |

Tests were also conducted relative to two gages of cold rolled mild steel and as shown below the data again indicated that best results are obtained when the filler wire is fed into the weld puddle during the last three-fifths of the welding cycle.

In all the test data referred to herein a 60 cycle per second supply was connected to the terminals 100 and 100′ and to the terminals 126 and 126′.

| Gage | Weld time (cy.) | Amps. | Wire (amt.) | Position of wire feed time in total weld time, cy. | Weld face dia. (in.) | Faying surface dia. (in.) | Under bead dia. (in.) | Tensile shear strength (lbs./sq. in) |
|---|---|---|---|---|---|---|---|---|
| .032/.032 | 90 | 100 | .2″ x .045″ | 10-40 | .139 | .121 | .115 | 770 |
| .032/.032 | 90 | 100 | .2″ x .045″ | 30-60 | .147 | .118 | .097 | 758 |
| .032/.032 | 90 | 100 | .2″ x .045″ | 50-80 | .150 | .139 | .128 | 848 |
| .058/.058 | 180 | 150 | .4″ x .045″ | 20-60 | .226 | .159 | .032 | 1,434 |
| .058/.058 | 180 | 150 | .4″ x .045″ | 60-100 | .238 | .164 | .059 | 1,532 |
| .058/.058 | 180 | 150 | .4″ x .045″ | 90-130 | .229 | .180 | .120 | 1,678 |

The apparatus embodying the teachings of this invention has several advantages. For instance, for a given diameter of under-bead the average tensile shear strength of the weld nugget is increased. As hereinbefore mentioned this results from the fact that for a given diameter of under bead the diameter of the faying surface of the weld nugget increases and the cone angle of the nugget decreases. In addition, the dimpling effect in the weld nugget is minimized thereby improving both the quality and the appearance of the weld. The quality is improved since crater cracks in the weld face are minimized. Further, the diameter of the weld face can be maintained at a minimum for a given average tensile shear strength for the particular weld. This is important where the welding space is limited and yet a high tensile shear strength for the weld is desired.

Since numerous changes may be made in the above apparatus and circuits and different embodiments may be made without departing from the spirit and scope thereof, it is intended that all matter contained in the foregoing description or shown in the accompanying drawing shall be interpreted as illustrative and not in a limiting sense.

We claim as our invention:

1. In tungsten arc spot welding apparatus of reflecting a weld in a predetermined welding cycle, the combination comprising, means including a welding gun for effecting an arc, feed means including motor means for feeding filler wire into said weld, a control means connected to said motor means for so controlling said motor means that said filler wire is fed into said weld only during the last three-fifths of said welding cycle.

2. In a method of arc spot welding wherein an arc is established between a metal work-piece and the end of a metallic electrode to form a weld puddle in the metal work-piece, the steps which comprise supplying to said electrode an arc welding current for a predetermined welding cycle, and feeding filler wire into said weld puddle during only the last three-fifths of said welding cycle.

3. In tungsten arc spot welding apparatus for effecting a weld in the work in a predetermined welding cycle, the combination comprising, a welding gun including an electrode, means for connecting said electrode in an arc welding circuit to thereby establish and maintain during said welding cycle an arc between said electrode and the work, feed means for feeding filler wire into said weld, and control timing means, connected to be responsive to the action of said welding gun and connected to control said feed means, for effecting the flow of said filler wire into said weld only during the last three-fifths of said welding cycle.

4. In tungsten arc spot welding apparatus for effecting a weld in the work in a predetermined welding cycle, the combination comprising, a welding gun including an electrode and a trigger, relay means responsive to the movement of said trigger for connecting said electrode in an arc welding circuit to thereby establish and maintain during said welding cycle an arc between said electrode and the work, feed means for feeding filler wire into said weld, and control timing means, connected to be responsive to the movement of said trigger and connected to control said feed means, for effecting the flow of said filler wire into said weld only during the last three-fifths of said welding cycle.

References Cited in the file of this patent

UNITED STATES PATENTS

| | | |
|---|---|---|
| 2,360,160 | Pickhaver | Oct. 19, 1944 |
| 2,571,684 | Craven | Oct. 16, 1951 |
| 2,776,361 | Essig | Jan. 1, 1957 |

UNITED STATES PATENT OFFICE

CERTIFICATE OF CORRECTION

Patent No. 2,892,925

June 30, 1959

William C. Butterfield et al.

It is hereby certified that error appears in the printed specification of the above numbered patent requiring correction and that the said Letters Patent should read as corrected below.

Column 8, line 29, claim 1, for "of reflecting" read -- for effecting --.

Signed and sealed this 26th day of January 1960.

(SEAL)
Attest:
KARL H. AXLINE
Attesting Officer

ROBERT C. WATSON
Commissioner of Patents